United States Patent [19]

Hara et al.

[11] 4,370,149

[45] Jan. 25, 1983

[54] DIAMOND COMPACT FOR A WIRE DRAWING DIE AND A PROCESS FOR THE PRODUCTION OF THE SAME

[75] Inventors: Akio Hara; Shuji Yazu, both of Itami, Japan

[73] Assignee: Sumitomo Electric Industries, Ltd., Japan

[21] Appl. No.: 227,971

[22] Filed: Jan. 23, 1981

[30] Foreign Application Priority Data

Sep. 6, 1980 [JP] Japan ................................ 55-123868

[51] Int. Cl.[3] ................................................ B24D 3/02

[52] U.S. Cl. ........................................ 51/309; 51/307; 72/146; 76/107 A

[58] Field of Search .................... 51/307, 309; 72/146; 76/107 A

[56] References Cited

U.S. PATENT DOCUMENTS 4,212,671 7/1980 Ettmayer .............................. 51/307
4,215,999 8/1980 Phaal .................................... 51/309
4,231,762 11/1980 Hara et al. ............................ 51/309
4,268,276 5/1981 Bovenkerk ............................ 51/309

FOREIGN PATENT DOCUMENTS 50-26746 of 1975 Japan .

*Primary Examiner*—Jeffery R. Thurlow
*Assistant Examiner*—W. Thompson
*Attorney, Agent, or Firm*—Wenderoth, Lind & Ponack

[57] ABSTRACT

This invention relates to a diamond compact for a wire drawing die, which comprises 70 to 95% by volume of diamond powder with a particle size of at most 50 microns and the balance of a binder phase consisting of a carbide of WC or (Mo, W)C with a particle size of at most 1 micron and an iron group metal, the carbide and iron group metal in the binder phase being in such a proportion by weight that the content of the carbide is more than that corresponding to the eutectic composition.

10 Claims, 6 Drawing Figures

2

1

DIAMOND COMPACT FOR A WIRE DRAWING DIE AND A PROCESS FOR THE PRODUCTION OF THE SAME

BACKGROUND OF THE INVENTION

1. Field of the Invention

The present invention relates to a sintered body for a wire drawing die and a process for the production of the same. More particularly, it is concerned with a diamond compact for a wire drawing die, which contains a binder phase of WC or (Mo, W)C with a small quantity of an iron group metal, and a process for the production of the same.

2. Description of the Prior Art

Up to the present time, WC-base cemented carbides alloys have been used as a tool material for a wire drawing die and natural diamond single crystals have been used for a thin wire, the surface of which should finely be finished. Compacts obtained by sintering diamond powders with binder metals under a superhigh pressure at a high temperature have lately been used as a die and a part of the dies of cemented carbides alloys or natural diamond have thus been replaced by such a die of diamond compact because of its properties excellent in wear resistance as well as strength. The above described diamond compact marketed for use as a die is a sintered body of diamond particles of about 60 microns containing about 10% by volume of a binder phase consisting predominantly of Co. This sintered body has such a structure that the circumference of a diamond sintered body is surrounded by a WC-Co alloy. Japanese Patent Application (OPI) No. 26746/1975 discloses a wire drawing die constructed of such a sintered body, which is produced by filling the inside of a surrounding support consisting of a WC-Co mixed powder compact with diamond powder and subjecting to sintering under a superhigh pressure and at a high temperature. In this case, during the sintering, the liquid phase of the WC-Co alloy penetrates the diamond powder from the circumference thereof, thus forming a binder phase for the diamond sintered body.

When using the diamond sintered body of coarse grain in the field where wire drawing dies of cemented carbides alloys were used in the prior art, the wear resistance has markedly been improved in some instances, but on the other hand, some difficulties have been made clear, one of which is for example that there remain scratches on the surface of a drawn wire as can be seen from the enlarged photograph of FIG. 1.

FIG. 1 is an enlarged photograph showing the surface of a wire when 1.5 tons of a brass-plated steel wire of 0.175 mm in diameter is drawn, and FIG. 2 is an enlarged photograph of the inner surface of a die during the same time. Numerous lengthwise scratches are found on the surface of a drawn wire. These scratches are possible caused by the fact that the binder material of a diamond sintered body used in this die, consisting predominantly of metallic cobalt, tends to adhere to a wire rod to be worked and exhibits a wear resistance considerably different from that of diamond crystal grains, so that the portions of the binder material are first of all worn during wire drawing to form concave portions into which the wire rod to be worked enter.

SUMMARY OF THE INVENTION

It is an object of the present invention to provide a diamond compact for a wire drawing die.

It is another object of the present invention to provide a diamond sintered body for a wire drawing die, whose binder phase is strengthened.

It is a further object of the present invention to provide a diamond sintered body for a wire drawing die, which is excellent in wear resistance and capable of giving a fine drawn wire surface.

It is a still further object of the present invention to provide a process for the production of a diamond sintered body for a wire drawing die.

These objects can be attained by a diamond compact for a wire drawing die, which comprises 70 to 95% by volume of diamond powder with a particle size of at most 50 microns and the balance of a binder phase consisting of a carbide of WC or (Mo, W)C with a particle size of at most 1 micron and an iron group metal, the carbide and iron group metal in the binder phase being in such a proportion by weight that the content of the carbide is more than that corresponding to the eutectic composition, and a process for the production of a diamond compact for a wire drawing die, which comprises grinding and mixing diamond powder optionally with WC powder or (Mo, W)C powder using a pot and balls lined or coated with a cermet consisting of WC or (Mo, W)C combined with an iron group metal, while during the same time, adding to the mixture a fine powder of the cermet with a particle size of at most 1 micron from the pot and balls, filling a ring-shaped cermet consisting of WC or (Mo, W)C presintered or combined with an iron group metal with the resulting mixed powder, subjecting to sintering at a temperature of at least 1200° C. under a pressure of at least 45 Kb and thereby combining the ring-shaped cermet with the diamond sintered body tightly.

BRIEF DESCRIPTION OF THE DRAWING

The accompanying drawings are to illustrate the principle and merits of the present invention in detail.

DETAILED DESCRIPTION OF THE INVENTION

Figure 1:
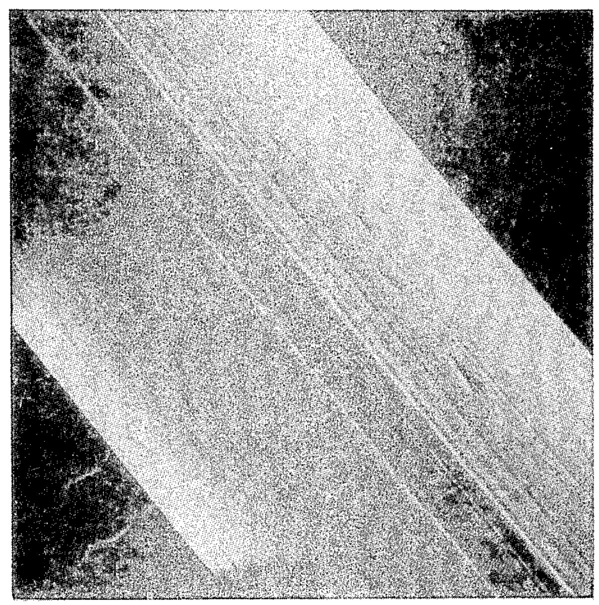
FIG. 1 is a photograph by an electron microscope of scanning type showing the surface state of a brass plated steel wire when it is drawn through a die made by the use of a commercially sold diamond compact for a wire drawing die for the comparison with the diamond compact of the present invention.

We, the inventors, have made efforts to overcome the disadvantages of the prior art diamond compacts for a wire drawing die as described above and consequently, have succeeded in obtaining a new diamond compact excellent in wear resistance and capable of giving a fine drawn wire surface.

The present invention provides a diamond compact or sintered body for a wire drawing die, which comprises 70 to 95% by volume of diamond powder with a particle size of at most 50 microns and the balance of a binder phase consisting of a carbide of WC or (Mo, W)C with a particle size of at most 1 micron and an iron group metal, the carbide and iron group metal in the binder phase being in such a proportion by weight that the content of the carbide is more than that corresponding to the eutectic composition. That is to say, the feature of the diamond compact according to the present invention, as to material, consists in that the diamond crystal particles are very fine, i.e. 50 microns or less, preferably 1 to 10 microns and, in addition, the binder material of the diamond crystal particles consists of not a metallic phase by a carbide of WC or (Mo, W)C with a particle size of 1 micron or less, as a predominant component, and a small amount of iron group metal as a sintering aid. Since the compact is a sintered body of fine diamond crystals and the binder phase thereof consists predominantly of a carbide having a high hardness and being excellent in wear resistance as set forth above, the surface scratches of a wire to be worked can remarkably be reduced during drawing.

For the purpose of examining the effect of the particle size of a diamond compact, as one feature of the present invention, samples of compacts with a particle size ranging from 0.3 to 100 microns were prepared and subjected to a wire drawing test. As a result of this test, it is found that a particle size of 1 to 10 microns is most suitable in view of the die life and the surface state of wire rods to be worked. If the particle size is smaller than this lower limit, the surface state of a wire is good but the die wears to a great extent. When a diamond compact containing a binder phase consisting mainly of WC or (Mo, W)C according to the present invention is compared with that containing a binder phase consisting mainly of Co according to the prior art, using diamond particles with the same particle diameter, there is obtained a result that the present invention is superior thereto in die life as well as wire surface state. This is due to the fact that in the present invention, the binder material is not a metal but a carbide having a high hardness and excellent wear resistance and adhesion or deposition resistance as a predominant component, and the content of an iron group metal is small. When using such a diamond compact for a wire drawing die, there scarcely take place adhesion to a wire rod to be worked and such a phenomenon that the binder material wears rapidly to form concave portions into which a wire rod to be worked enters. Moreover, the carbide used as a predominant component in the binder phase of the diamond compact according to the present invention is also effective for suppressing the particle growth of diamond during sintering under a superhigh pressure and at a high temperature due to dissolution in an iron group metal used as a sintering aid and precipitation therefrom. This can be accomplished by the uniform presence of the fine carbide particles among diamond crystal particles during sintering. The carbide used in the binder according to the present invention is WC or (Mo, W)C having the same crystal structure as WC. These carbides are usually used with iron group metals to form wear resisting tools through sintering, which have an excellent wear resistance and high strength, and in the present invention, they are used as a binder of diamond crystal particles thus to raise the wear resistance of the binder phase in the compact and to obtain a diamond compact with a high strength.

The diamond compact of the present invention has a composition comprising 70 to 95% by volume of diamond powder and the balance of a cermet consisting predominantly of WC or (Mo, W)C. If the content of diamond exceeds 95%, the quantity of the carbide present in the boundary of diamond particles is insufficient and the effect of suppressing the particle growth of diamond during sintering is thus deteriorated, while if the content of diamond is less than 70%, the wear resistance is lowered when used as a wire drawing die. The proportion of a compound such as carbide of WC or (Mo, W)C to an iron group metal, which are to be the binder of diamond in the compact, cannot be simply defined, but it should be so adjusted that the compound is present as solid, at least, during sintering. In the case of using WC as the compound and Co as the binder metal, for example, the proportion of WC to Co should be about 50% by weight or more. A preferred range of the proportion is 60 to 90% by weight of the carbide.

When using a Mo-containing carbide, in particular, (Mo, W)C having the same crystal structure as WC as the main component of the binder of diamond, on the other hand, the properties can further be improved, because this carbide has less adhesion to wires to be processed than the other compound, i.e. WC. This property is considered to be due to that of the oxide formed on the friction surface. That is to say, molybdenum carbide is oxidized to form $MoO_3$ which has a laminar structure and serves as a self-lubricant with the lowest coefficient of friction.

In carbides represented by (Mo, W)C, those having a higher content of Mo, for example, mol fraction of Mo in the range of 0.95–0.6 are preperable.

In the production of the compact of the present invention, diamond powder and a fine powder of 1 micron or less comprising WC or (Mo, W)C and an iron group metal are uniformly mixed. When diamond having a high hardness is mixed with other materials, the inner wall of a mixer is scraped and the scraped powder is added as an impurity. If diamond powder with a predetermined particle size is ball milled using a pot which inner surface is lined with a cermet consisting of sintered WC or (Mo, W)C and an iron group metal and balls made of the same material so as to utilize this phenomenon, a uniformly mixed powder of the diamond powder and a fine powder of the cermet scraped by the corners of the diamond powder can readily be obtained. The quantity of the cermet fine powder as a binder can be controlled by changing the time of ball milling according to the particle size of diamond powder. When it is desired to change the composition of the binder material, the material of the lining of a pot and balls is changed, or a predetermined amount of WC or (Mo, W)C powder is previously added to diamond powder.

Figure 5:
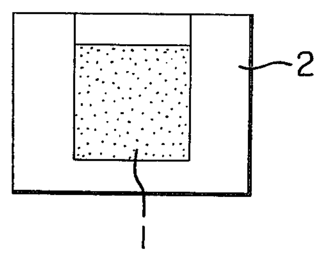
FIG. 5 is to illustrate a process for preparing the diamond compact according to the present invention, in which 1 is diamond powder mixed with a binder powder and 2 is a cermet vessel filled with the diamond powder.
Figure 6:
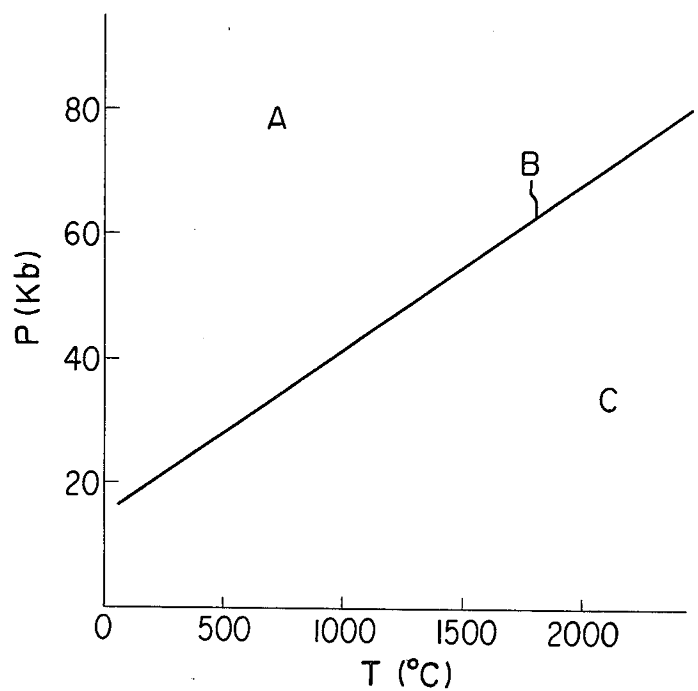
FIG. 6 is a graph showing the relationship between the pressure and temperature of diamond, in which A is diamond stable zone, B is diamond-graphite equilibrium line and C is graphite stable zone.

The mixed powder 1 prepared in this way is filled in a ring-shaped cermet 2 consisting of a presintered WC or (Mo, W)C powder combined with an iron group metal as shown in FIG. 5 and charged in a superhigh pressure and high temperature apparatus used for the synthesis of diamond. The system is compressed and then heated. Thus, the assembly is heated and sintered at a temperature and under a pressure in the diamond stable zone A shown in FIG. 6 for 1 minute or more. It is required that the sintering temperature is at least the liquid phase producing temperature of a cermet to be a binder phase of a diamond compact. In the present invention, sintering is ordinarily carried out at a temperature of 1200° C. or higher, since the eutectic melt producing temperature of a (Mo, W)C with a higher content of Mo and an iron group metal is about 1200° C. A preferable temperature range is 1250° to 1500° C. The lower limit of pressure corresponding thereto is about 45 Kb in view of the diamond stable zone A shown in FIG. 6. A preferable pressure range is 48 to 65 Kb. The diamond compact or sintered body can be combined with the ring-shaped cermet during sintering. This ring-shaped cermet plays a role as a vessel for determining the shape of the diamond compact portion under a superhigh pressure and imparts pressure to the diamond powder with deformation during sintering. Therefore, it is necessary to select for such a cermet a material with such a high strength and high capability of plastic deformation that it is not broken even if compressed under a superhigh pressure. In the present invention, a cermet capable of satisfying this object is used which consists predominantly of WC or (Mo, W)C with 5 to 40% by weight of an iron group metal such as Ni, Co or Fe.

In the present invention, the carbide used in the binder phase of a diamond compact is WC or (Mo, W)C, but it may optionally contain other metal carbides such as carbides of Ti, Zr, Hf, Cr, V, Ta and Nb in such a small amount that the strength and wear resistance of the binder phase are not deteriorated. Similarly, the cermet combined with to surround the diamond compact portion may optionally contain the other carbides in such a small amount that the required properties are not deteriorated.

The present invention will be illustrated in detail by the following examples without limiting the same, in which percents are to be taken as those by weight unless otherwise indicated.

EXAMPLE 1

Using a pot lined with a cermet having a composition of $(Mo_{0.9}W_{0.1})C$—10% Co—10% Ni and balls of the same cermet, 20 g of diamond powder with a particle size of 3 microns was ball milled. Measurement of the weight of the powder recovered after ball milling for 4 hours gave an increase of 4.9 g.

Chemical analysis of the resultant powder showed that it contained 15.6% of $(Mo_{0.9}W_{0.1})C$ and 3.9% of (Co+Ni). The content of diamond in the mixed powder was 91.7% by volume. On the other hand, a sintered body with an outer diameter of 8 mm, inner diameter of 2 mm and height of 4 mm consisting of $(Mo_{0.7}W_{0.3})C$—25% Ni—5% Co was prepared and filled with the above described mixed powder. Then, the sintered body filled with the powder was charged in a superhigh pressure apparatus of Guardle type, is compressed under a pressure of 55 Kb, heated to 1300° C. by passing electric current and held for 20 minutes. When the sample was taken after lowering the temperature and pressure, the appearance thereof was fine with a high dimensional precision, and the diamond compact portion was completely combined with the outer (Mo, W)C-Co-Ni alloy. Observation of the structure of the compact, which was previously polished, showed that the particle size of diamond in the diamond compact was about 2.3 microns substantially the same as that of the diamond powder after ball milled and there hardly took place particle growth during sintering. A hole was made on the central part of the compact by laser working to obtain a wire drawing die for a wire of 0.175 mm in diameter. When the inner surface of this die hole was subjected to lapping, there was obtained a mirror-like surface substantially the same as that of a die of natural diamond single crystal.

Figure 3:
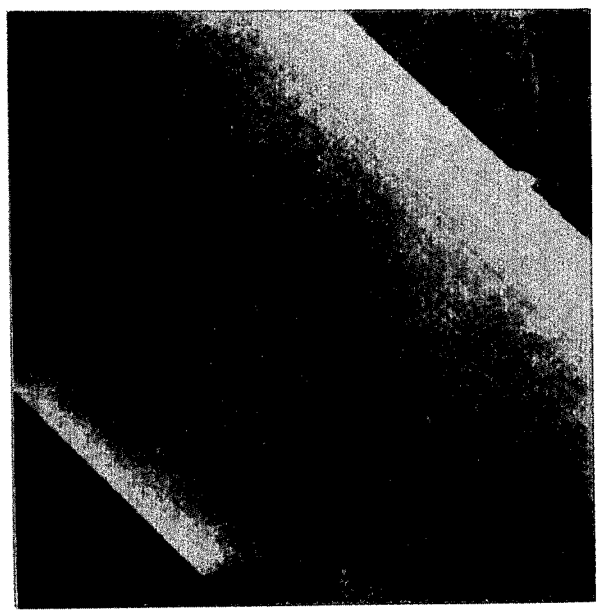
FIG. 3 and FIG. 4 are similar electron micrographs showing respectively the surface of a wire and the inside of a die in the case of the diamond compact of the present invention.
Figure 4:
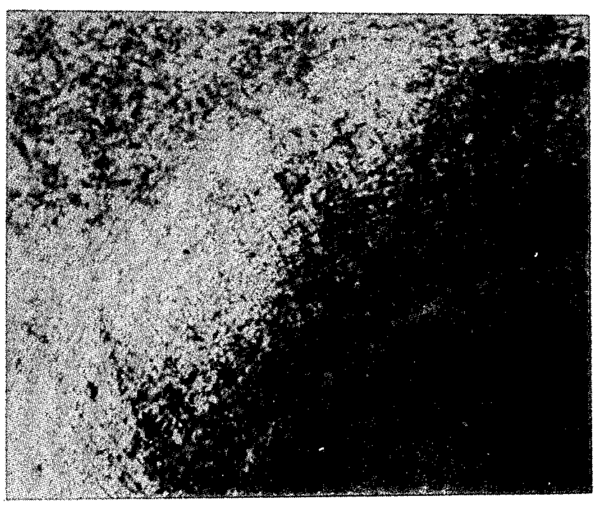

When a brass plated steel wire was drawn at a drawing speed of 800 m/min using this die with a water-soluble lubricating oil, a wire drawing of 3,6125 Kg was possible with obtaining a very good drawn surface, while the average die life corresponded to a wire drawing of 150 Kg in the case of drawing under the same condition but through a die of WC-Co cemented carbide alloy. The states of the wire surface and the die surface, obtained in the former case, were very excellent as shown in FIG. 3 and FIG. 4.

Figure 2:
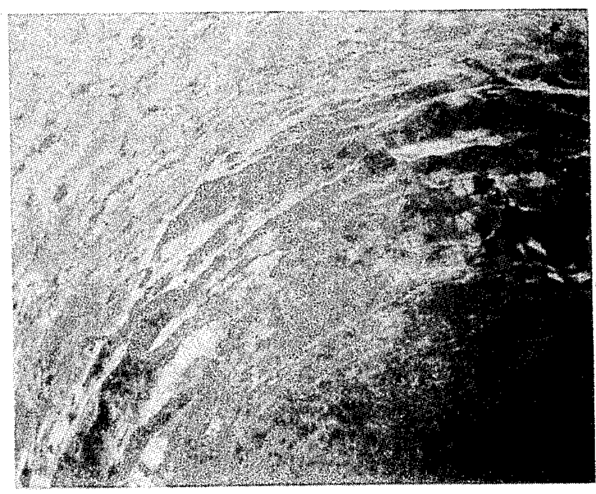
FIG. 2 is a similar electron micrograph showing the worn state of the inside of the above described prior art die.

For comparison, a similar wire drawing die was prepared using a diamond compact of a marketed diamond powder having a particle size of 60 microns with a binder phase consisting mainly of Co and then subjected to wire drawing under the same condition. When 1,500 Kg was drawn, the surface state of the wire was deteriorated. The states of the wire surface and die inner surface at that time are shown in FIG. 1 and FIG. 2. As shown in FIG. 2, the portion of Co binder phase in the grain boundary of diamond crystals is deeply scraped.

EXAMPLE 2

Mixed powders having the compositions as shown in Table 1 were prepared by varying the particle size of diamond powder, time of ball milling material of ball milling pot and balls, etc.

TABLE 1

| Sample No. | Particle Size of Diamond (μ) | Amount of Diamond (vol %) | Binder Composition (%) Carbide | Binder Composition (%) Metal | Sintering Conditions Pressure (Kb) | Sintering Conditions Temperature (°C.) | Die Properties Amount of Wire Drawn (ton) | Die Properties Surface State of Wire Drawn* |
|---|---|---|---|---|---|---|---|---|
| 1 | 0.3 | 85 | 80 WC | 20 Co | 55 | 1350 | 20 | A |
| 2 | 0.6 | 85 | 80 WC | 20 Co | 55 | 1350 | 30 | A |
| 3 | 2.3 | 85 | 80 WC | 20 Co | 55 | 1350 | 50 | A |
| 4 | 15 | 90 | 80 WC | 20 Co | 55 | 1400 | 50 | B |
| 5 | 80 | 92 | 80 WC | 20 Co | 55 | 1400 | ~0 | C |
| 6 | 2.3 | 84 | 70 $(Mo_{0.9}W_{0.1})$ | 15 Ni, 15 Co | 50 | 1250 | 100 | A |
| 7 | 2.3 | 87 | 40 $(Mo_{0.9}W_{0.1})$ | 30 Ni, 30 Co | 50 | 1300 | 30 | B |
| 8 | 8.7 | 85 | 70 $(Mo_{0.7}W_{0.3})$ | 25 Ni, 5 Co | 55 | 1350 | 70 | A |
| 9 | 8.7 | 85 | 80 $(Mo_{0.9}W_{0.1})$ | 19.5 Ni, 0.5 Fe | 50 | 1300 | 80 | A |
| 10 | 8.5 | 70 | 70 $(Mo_{0.5}W_{0.5})$ | 30 Ni | 55 | 1350 | 50 | A |

TABLE 1-continued

| Sample No. | Particle Size of Diamond (μ) | Amount of Diamond (vol %) | Binder Composition (%) Carbide | Binder Composition (%) Metal | Sintering Conditions Pressure (Kb) | Sintering Conditions Temperature (°C.) | Die Properties Amount of Wire Drawn (ton) | Die Properties Surface State of Wire Drawn* |
|---|---|---|---|---|---|---|---|---|
| 11 | Marketed Diamond Compact | | | | | | ~0 | C |

Note:
*A: Good; B: Normal; C: Bad

Sample Nos. 1 to 5 were filled in a sintered body having an outer diameter of 8 mm, inner diameter of 2 mm and height of 4 mm, consisting of WC—10% Co alloy, and Sample Nos. 6 to 10 were filled in another sintered body having the same dimension, consisting of $(Mo_{0.7}W_{0.3})C$—25% Ni—5% Co. These samples were subjected to sintering in an analogous manner to Example 1 under the conditions shown in Table 1. The pressure and temperature conditions during sintering were as shown in Table 1 and the time of heating and holding the sample was all 20 minutes.

These sintered bodies were worked in dies for a wire of 1.185 mm in diameter and subjected to a wire drawing test of a copper plated steel wire at a wire drawing speed of 300 m/min using a water-soluble lubricating oil, thus obtaining results as shown in Table 1. In the case of Sample Nos. 3, 4, 6, 8, 9 and 10 according to the present invention, a wire drawing of 50 tons or more was possible and a good wire surface was given, while in the case of Sample No. 5 (coarse particles) and Sample No. 11 (marketed compact) for comparison, scratches were formed on the wire surface from the beginning and they soon became unfit for use.

What is claimed is:

1. A diamond compact for a wire drawing die, which comprises 70 to 95% by volume of diamond powder with a particle size of at most 50 microns and the balance of a binder phase consisting of a carbide of WC or (Mo, W)C with a particle size of at most 1 micron and an iron group metal, the carbide and iron group metal in the binder phase being in such a proportion by weight that the content of the carbide is more than that corresponding to the eutectic composition.

2. The diamond compact as claimed in claim 1, wherein the particle size of the diamond powder in the compact is 1 to 10 microns.

3. The diamond compact as claimed in claim 1, wherein the binder phase consists of 50% by weight or more of a carbide of (Mo, W)C containing Mo as a predominant component and 50% by weight or less of an iron group metal.

4. The diamond compact as claimed in claim 1, wherein the circumference of the diamond compact is surrounded by a cermet consisting of WC or (Mo, W)C combined with an iron group metal.

5. The diamond compact as claimed in claim 4, wherein the carbide of (Mo, W)C contains Mo as a predominant component.

6. The diamond compact as claimed in claim 4, wherein the iron group metal is in a proportion of 5 to 40% by weight.

7. The diamond compact as claimed in claim 1, wherein the carbide is partly replaced by at least on carbide selected from the group consisting of Ti, Zr, Hf, Cr, V, Ta and Nb.

8. The diamond compact as claimed in claim 4, wherein the carbide of the cermet is partly replaced by at least one carbide selected from the group consisting ot Ti, Zr, Hf, Cr, V, Ta and Nb.

9. A process for the production of a diamond compact for a wire drawing die, which comprises grinding and mixing diamond powder optionally with WC powder or (Mo, W)C powder using a pot and balls lined and coated respectively with a cermet consisting of WC or (Mo, W)C combined with an iron group metal, while during the same time, adding to the mixture a fine powder of the cermet with a particle size of at most 1 micron from the pot and balls, filling a ring-shaped cermet consisting of WC or (Mo, W)C presintered or combined with an iron group metal with the resulting mixed powder, subjecting to sintering at a temerature of at least 1200° C. under a pressure of at least 45 Kb and thereby combining the ring-shaped cermet with the diamond sintered body tightly.

10. The process as claimed in claim 9, wherein the (Mo, W)C contains Mo as a predominant component.

* * * * *